United States Patent [19]

Imazaike

[11] Patent Number: 4,807,066

[45] Date of Patent: Feb. 21, 1989

[54] CASSETTE CHANGER FOR MAGNETIC RECORDING-REPRODUCTION APPARATUS

[75] Inventor: Mikiharu Imazaike, Osaka, Japan

[73] Assignees: Matsushita Denki Sangyo Kabushiki Kaisha; Imazaike Seiko Kabushiki Kaisha, both of Osaka, Japan

[21] Appl. No.: 29,288

[22] Filed: Mar. 23, 1987

[30] Foreign Application Priority Data

Mar. 31, 1986 [JP] Japan ................................ 61-75107

[51] Int. Cl.$^4$ .............................................. G11B 1/68
[52] U.S. Cl. ................................................... 360/92
[58] Field of Search ................... 360/85, 92, 93, 95, 360/96.5, 96.6, 98; 242/181, 197-199

[56] References Cited

U.S. PATENT DOCUMENTS

| | | | |
|---|---|---|---|
| 3,484,055 | 12/1969 | Raine | 242/181 |
| 4,160,281 | 7/1979 | Sato | 360/92 |
| 4,164,765 | 8/1979 | Gysling | 360/92 |
| 4,420,779 | 12/1983 | Takano et al. | 360/92 |
| 4,622,610 | 11/1986 | Makigawa | 360/92 |
| 4,665,455 | 5/1987 | Mesher | 360/98 |

FOREIGN PATENT DOCUMENTS

| | | | |
|---|---|---|---|
| 2359442 | 10/1975 | Fed. Rep. of Germany | 360/92 |
| 59-98344 | 6/1984 | Japan | 360/96.6 |
| 60-234258 | 11/1985 | Japan | 360/92 |

*Primary Examiner*—John H. Wolfe
*Attorney, Agent, or Firm*—Jordan and Hamburg

[57] ABSTRACT

A cassette changer for automatically inserting and discharging (changing) tape cassettes for a magnetic recording-reproduction apparatus of the front loading type, such as a video tape recorder. The cassette changer has a cassette discharge path for discharging a cassette along a slope when the cassette is ejected from the cassette inlet-outlet opening of the apparatus after recording or reproduction, a cassette insertion path intersecting the discharge path in front of the opening for guiding a new cassette along a horizontal plane into the opening for recording or reproduction, and a separator disposed at the intersection for alternately opening the paths for the discharge and insertion of the cassette.

13 Claims, 11 Drawing Sheets

FIG. 10

CASSETTE CHANGER FOR MAGNETIC RECORDING-REPRODUCTION APPARATUS

BACKGROUND OF THE INVENTION AND RELATED ART STATEMENT

The present invention relates to a cassette changer for automatically changing (inserting and discharging) dubbing or like tape cassettes for magnetic recording-reproduction apparatus of the front loading type, such as a video tape recorder (hereinafter referred to briefly as "VTR").

The cassette changer to be used, for example, for VTR's (the following description will be given with reference to these recorders) includes a system wherein the cassette used for recording or reproduction (hereinafter referred to as the "processed cassette") is discharged along a cassette discharge path from the cassette inlet-outlet opening in the front side of the VTR, and another cassette for recording or reproduction (hereinafter referred to as a "new cassette") is placed into the opening through a cassette insertion path. Accordingly, the system requires means for a change-over from one path to the other for the discharge or insertion of the cassette and also means for discharging and inserting the cassette.

To effect a change-over from one path to the other, the conventional cassette changer is adapted to shift the paths per se. For example, the two paths are provided on a horizontal turntable, which is rotated for the change-over. The change-over means for the paths is therefore complex in construction and large-sized and further requires drive means in addition to the drive means for the cassette discharge and insertion means, consequently making the cassette changer complex in structure and larger in its entirety to result in disadvantages in respect of space, cost, reliability of operation and durability.

An object of the present invention is to provide a cassette changer for magnetic recording-reproduction apparatus which is free of the above drawbacks.

Other objects and advantages of the present invention will become apparent from the following description.

SUMMARY OF THE INVENTION

The present invention provides a cassette changer which is mountable on a magnetic recording-reproduction apparatus at the front side thereof formed with a cassette inlet-outlet opening and which has a cassette discharge path for allowing a cassette to slide down a slope when the cassette is delivered from the inlet-outlet opening after recording or reproduction, a cassette insertion path positioned above the discharge path for guiding a cassette along a horizontal plane to the inlet-outlet opening for recording or reproduction, the insertion path intersecting the discharge path in front of the inlet-outlet opening, a separator pivotably supported at the intersection of the two paths and pivotally movable between a cassette insertion position where the separator closes the discharge path while opening the insertion path by being depressed by the cassette for recording or reproduction and a cassette discharge position where the separator closes the insertion path while opening the discharge path by being acted on by a spring, cassette delivery means for transferring the cassette from the inlet-outlet opening into the discharge path after recording or reproduction, and cassette insertion means for transporting the cassette to the inlet-outlet opening along With the cassette changer of the above construction, the cassette insertion path is changed over to the cassette discharge path and vice versa by the separator which is pivotally movable by the force of the spring and by the force of travel of the cassette. This eliminates the need to provide drive means specifically for the change of the path, rendering the change-over means simple in construction and small-sized.

According to the present invention, the cassette insertion means included in the cassette changer comprises a guide groove formed in each of opposite side plates provided at opposite sides of the insertion path to define the insertion path, the guide groove extending in parallel with the insertion path, a slider engaged in the guide groove and slidingly movable forward and rearward along the guide groove, a drive mechanism for moving the slider forward and rearward, a pushing pawl supported by a vertical pivot on the slider and movable about the vertical pivot into the insertion path to a projected position to push the cassette toward the inlet-outlet opening, the pushing pawl being retractable from the insertion path, and a spring for holding the pushing pawl in the projected position.

The cassette insertion means thus constructed is simpler in construction and causes the cassette to travel at a larger stroke, for example, as compared with insertion means having an arm which is rotated for pushing the cassette into the inlet-outlet opening. Furthermore, the cassette is unlikely to incline or slip and can be inserted into the opening smoothly and reliably.

Further according to the present invention, the cassette delivery means of the changer comprises a pair of delivery rollers disposed close to the inlet-outlet opening at opposite sides thereof respectively, each of the delivery rollers being rotatable about a vertical shaft and being mounted on a roller support member so as to be movable between a projected position to come into pressing contact with the cassette on one side thereof opposed to the roller when the cassette is ejected from the inlet-outlet opening and a retracted position away from said side of the cassette, a spring for holding the delivery rollers in their projected position, a mechanism for moving the delivery rollers to their retracted position against the spring and a mechanism for rotating the delivery rollers.

With the above construction, the cassette is held between the pair of delivery rollers and thereby discharged from the inlet-outlet opening reliably. Since the delivery rollers can be held in their retracted position away from the opposite sides of the cassette until the cassette is ejected from the inlet-outlet opening, there is no likelihood that the delivery rollers will block the cassette to be ejected.

The cassette changer includes a pair of opposed roller support arms provided along the outer surfaces of the side plates respectively, each of the support arms being pivotally movable as supported at its one end and being positioned in the path of movement of the slider so that the other arm end in front of the inlet-outlet opening at each side thereof is pushed outward by the slider when the cassette is inserted. The pair of delivery rollers are mounted on the pair of support arms respectively at eht other arm ends, each of the delivery rollers being rotatable about a vertical shaft and movable by the pivotal movement of the support arm between a projected position to come into pressing contact with the cassette on one side thereof opposed to the roller when the cassette is ejected from the inlet-outlet opening and a retracted position away from the above-mentioned side of the cassette.

In the arrangement described above, the sliders constituting the cassette insertion means serve also as components of the roller moving mechanism of the cassette delivery means, consequently rendering the changer simple in construction.

BRIEF DESCRIPTION OF THE DRAWINGS

FIGS. 8 (a) to (g) are side elevations schematically showing how the cassette is changed by the embodiment;

DESCRIPTION OF THE PREFERRED EMBODIMENTS

Figure 2:
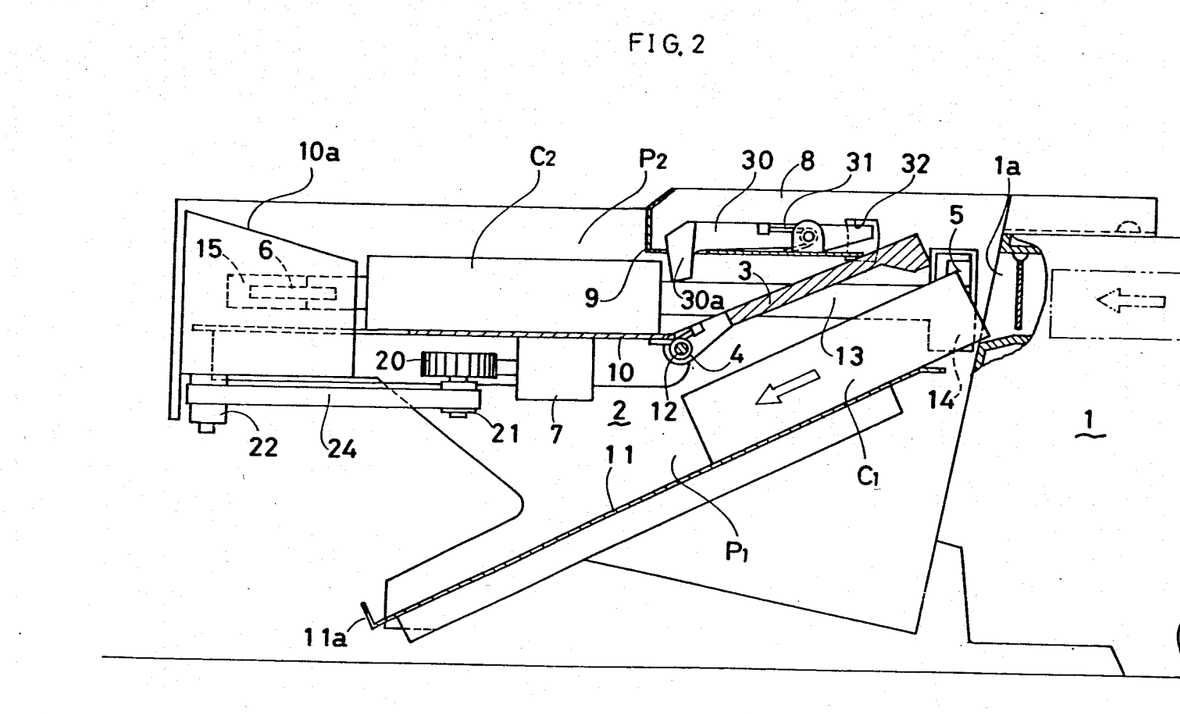
FIG. 2 is a view in section taken along the line II—II in FIG. 1.
Figure 3:
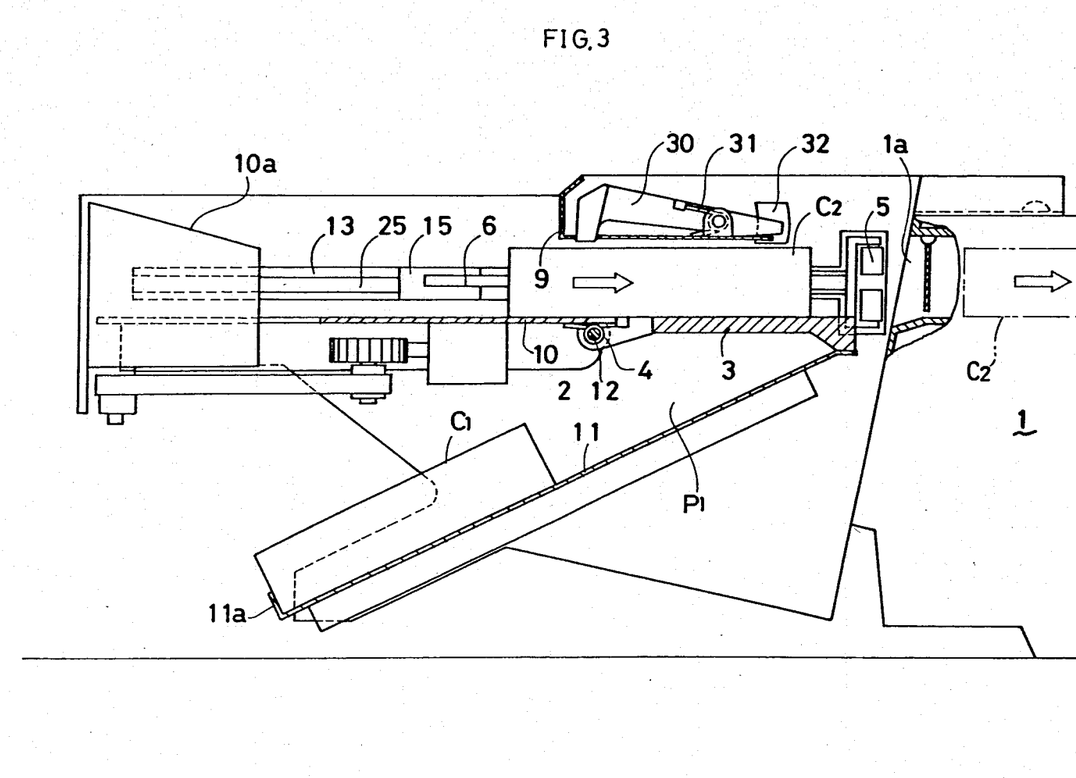
FIG. 3 is a view corresponding to FIG. 2 and showing the embodiment when a cassette is to be inserted into a VTR.

With reference to the drawings, indicated at 1 is a VTR of the front loading type having a cassette inlet-outlet opening 1a in its front side (see FIGS. 2, 3, etc.). The cassette inserted into the opening 1a of the VTR 1 is transported to a recording-reproduction position by a loading mechanism within the VTR and ejected from the opening 1a automatically after recording or reproduction.

Figure 8:
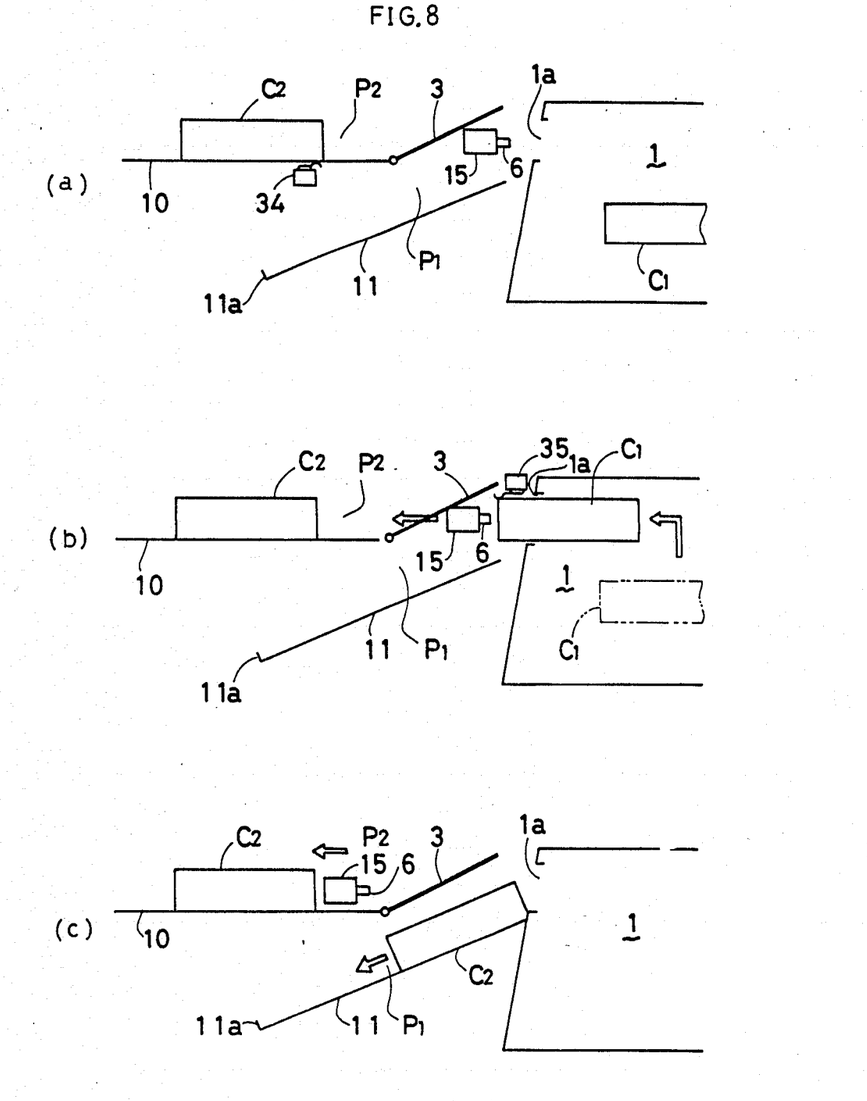

A cassette changer 2 is mounted on the VTR 1 at the front side thereof for discharging the cassette, delivered to the opening 1a, from the VTR and for placing a new cassette into the opening 1a. With reference to FIGS. 2, 3 and 8, the processed cassette discharged is indicated at C1, and the new cassette to be placed in at C2.

The construction and operation of the cassette changer 2 will be described generally, chiefly with reference to FIGS. 1 to 3 and 8. The cassette changer 2 has a forwardly downwardly inclined cassette discharge path P1 and a horizontal cassette insertion path P2 intersecting the path P1 immediately in front of the inlet-outlet opening 1a. At the intersection of the two paths P1 and P2, a separator 3 is provided as supported at its front end and is pivotally movable upward and downward. As seen in FIGS. 3 and 8 (e), the separator 3 is movable between a horizontal cassette insertion position where the separator 3 closes the discharge path P1 while opening the insertion path P2 by being depressed by the new cassette C2 inserted into the path P2 and a forwardly downwardly inclined cassette discharge position where the separator 3 closes the insertion path P2 while opening the discharge path P1 by being acted on by a coiled torsion spring 4 provided at the support point of the separator. Thus, the separator 3 selectively opens one of the paths P1 and P2 to permit the opening 1a to communicate with the discharge path P1 for discharging the cassette or with the insertion path P2 for inserting the cassette into the opening.

The cassette changer 2 further has a pair of delivery rollers 5, 5 disposed at opposite sides of its rear end opposed to the inlet-outlet opening 1a and constituting cassette delivery means, pushing pawls 6, 6 disposed at opposite sides of the insertion path P2, movable forward and rearward and constituting cassette insertion means, drive means comprising a motor 7 as its drive source for driving the delivery rollers 5 and the pushing pawls 6, and means for controlling the motor 7 upon detecting the position of the cassette. By the operation of these means, the processed cassette C1 delivered to the opening 1a by ejection is transferred to the discharge path P1 and allowed to slide down the path P1, while the new cassette C2 is placed into the opening 1a along the insertion path P2.

The cassette changer 2 will be described below in greater detail.

A pair of opposed side plates 8, 8 are fastened at their rear ends to the top of the VTR 1 at its front end as by screws, whereby the cassette changer 2 is attached to the front side of the VTR 1. Provided between and attached to the opposed side plates 8, 8 are a top frame 9 at the top of the changer rear portion, an insertion guide plate 10 positioned at the front half of the changer and disposed at an intermediate portion of its height, and a discharge guide plate 11 at the lower portion of the changer. The insertion path P2 is defined by the insertion guide plate 10 and the separator 3 as set in the cassette insertion position. The discharge path P1 is defined by the discharge guide plate 11 and the separator 3 as set in the cassette discharge position. Positioning members 10a, 10a for the new cassette C2 are provided at the opposite sides of the front end of the insertion guide plate 10. The discharge guide plate 11 is provided at its front end with a stopper 11a for retaining the cassette C1 on the plate 11 when it is discharged.

The separator 3 is supported at its front end by a horizontal pin 12 on the rear end of the insertion guide plate 10 and is pivotally movable upward and downward. The rear end of the separator 3 bears against the top frame 9 when the cassette is to be discharged, or against the rear end of the discharge guide plate 11 when the cassette is to be inserted, whereby the separator is held in the cassette discharge position or in the cassette insertion position. The coiled torsion spring 4 for biasing the separator 3 toward the cassette discharge position is wound around the horizontal pin 12 and has one end attached to the separator 3 and the other end attached to the rear end of the insertion guide plate 10.

Each of the side plates 8, 8 has a guide groove 13 positioned at a level to oppose the insertion path P2 and extending substantially over the entire length of the side plate in parallel with the path P2. The side plate 8 has an opening 14 at the rear end of the guide groove 13. The openings 14 are positioned close to the opposite side ends of the opening 1a. A slider 15 engaged in each guide groove 13 is slidingly movable forward and rearward. The delivery roller 5 is projectably provided in the opening 14.

Figure 1:
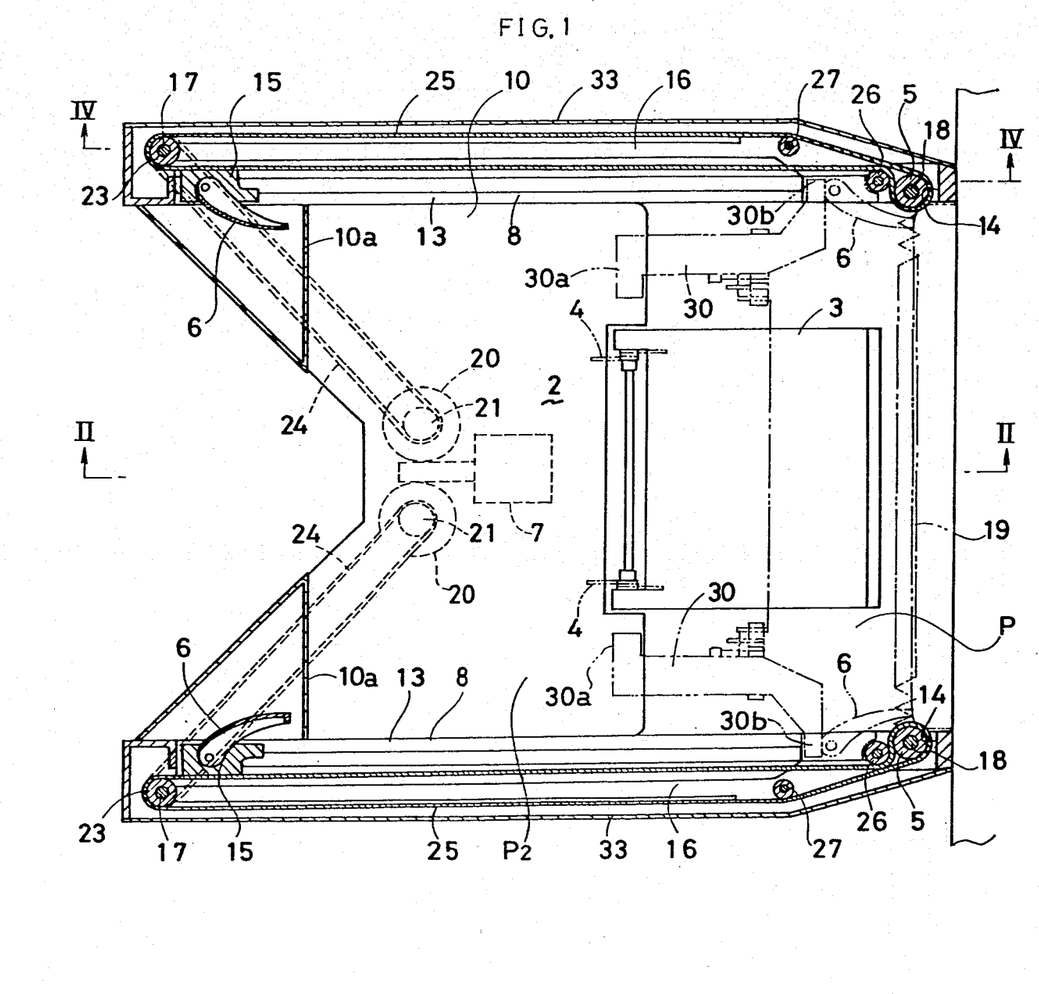
FIG. 1 is a view in horizontal section showing a cassette changer embodying the invention.
Figure 4:
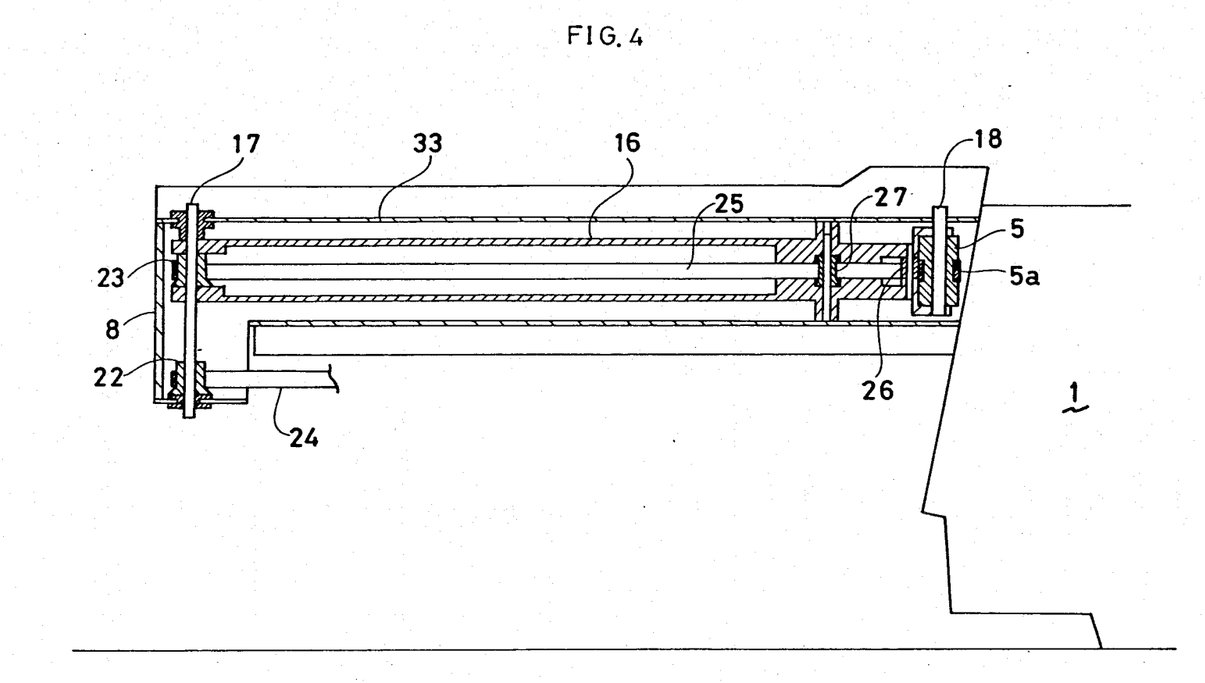
FIG. 4 is a view in section taken along the line IV—IV in FIG. 1.
Figure 5:
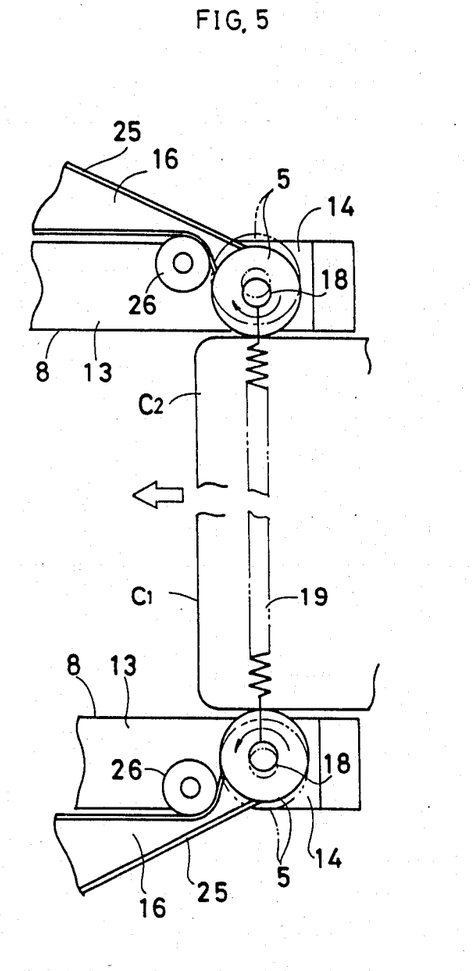
FIG. 5 is a plan view on an enlarged scale showing a delivery roller assembly included in the embodiment.

With reference to FIGS. 1, 4 and 5, a roller support arm 16 is provided along the outer surface of each side plate 8 and supported at its front end by a vertical shaft 17 on the front end of the side plate. The arm 16 is pivotally movable sidewise about the shaft 17. The delivery roller 5 is rotatably supported by a vertical shaft 18 on the rear end of the support arm 16 and is accommodated in the opening 14 of the side plate 8. The roller 5 is movable by the pivotal movement of the support arm 16 between a position (hereinafter referred to as a "projected position") where the roller is projected from the side plate inwardly thereof and located in front of the opening 1a at the corresponding side thereof, and a retracted position within the opening 14. A coiled tension spring 19 extends between and is attached to the vertical shafts 18, 18 of the pair of delivery rollers 5, 5 for holding the rollers 5, 5 in their projected position.

The delivery rollers 5 and the sliders 15 are commonly driven by a belt drive mechanism. Stated more specifically with reference to FIGS. 1 to 3, the motor 7 and a pair of gears 20, 20 drivingly rotatable by the motor 7 are attached to the bottom side of the insertion guide plate 10. Left-side and right-side drive pulleys 21, 21 are mounted on the shafts of the gears 20, 20, respectively. Since power is transmitted from the drive pulleys 21 to the delivery rollers 5 and to the sliders 15 through identical arrangements at opposite sides of the changer, the arrangement at one side only will be described. As seen in FIGS. 1 and 4, lower and upper two intermediate pulleys 22, 23 are mounted on the vertical shaft 17 disposed at the front end of the side plate 8 and serving as the pivot for the support arm 16. A first timing belt 24 is reeved around the lower intermediate pulley 22 and the drive pulley 21, and a second timing belt 25 around the upper intermediate pulley 23 and the delivery roller 5. The slider 15 is fastened to the second timing belt 25 as by a screw and is made movable with the belt 25 forward and rearward. To hold the second timing belt 25 out of contact with the cassette C1, the delivery roller 5 is formed at an intermediate portion of its height with a pulley portion 5a of reduced diameter, around which the second timing belt 25 is reeved. Idle pulleys 26 and 27 are disposed along the path of travel of the second timing belt 25.

Thus, the torque of the motor 7 is delivered to the delivery roller 5 and to the slider 15 via the drive pulley 21, first timing belt 24, lower and upper intermediate pulleys 22, 23 and second timing belt 25, whereby the slider 15 is moved forward or rearward along the guide groove 13 simultaneously with the rotation (forward or reverse) of the delivery roller 5.

Figure 6:
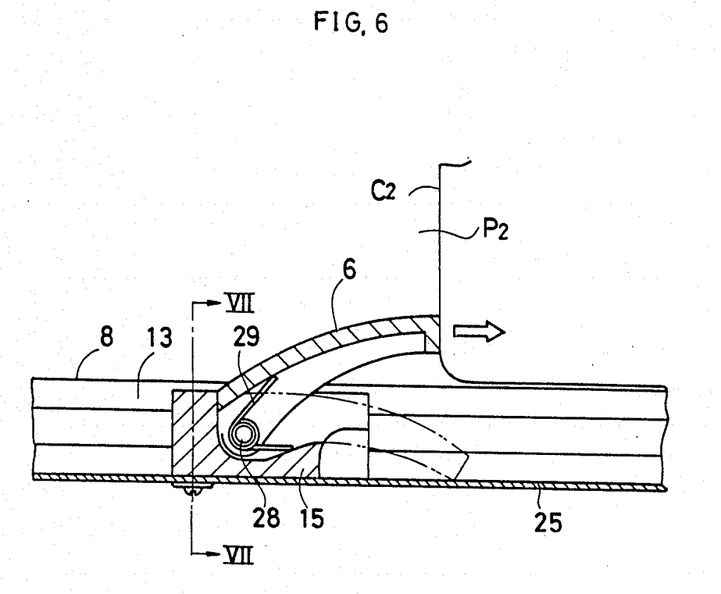
FIG. 6 is an enlarged view in horizontal section showing a pushing pawl assembly included in the embodiment.

As shown on an enlarged scale in FIG. 6, the pushing pawl 6 is rotatably supported at its front end by a vertical pivot 28 on the slider 15 and made movable with the slider 15 forward and rearward. The pushing pawl 6 is held projected into the insertion path P2 by a coiled torsion spring 29 mounted on the vertical pivot 28 and is retracted from the path P2 (into the guide groove 13) as indicated in phantom line in FIG. 6 by coming into contact with the side surface of the new cassette C2 while moving backward with the cassette placed on the insertion guide plate 10.

When each slider 15 is brought to the rear end of the guide groove 13 as indicated in a phantom line in FIG. 1, the rear end of the roller support arm 16 is pushed outward by the slider 15, whereby the delivery roller 5 is set in its retracted position. The delivery roller 5 is returned to its projected position when the slider 15 is moved forward along the guide groove 13. For the convenience of description, the movement of the sliders 15, the pushing pawls 6 and the cassettes C1, C2 will hereinafter be referred to as "advance" when they are moved toward the VTR 1 or as "retraction" when they are moved away from the VTR 1.

The top frame 9 is provided, at each of its opposite sides, with a stopper lever 30 which is movable like a seesaw as supported at a longitudinally intermediate portion thereof for preventing the new cassette C2 placed on the insertion guide plate 10 from advancing inadvertently. The stopper lever 30 is usually held in a forwardly upwardly inclined position as seen in FIG. 3 by a coiled torsion spring 31 provided on the pivot therefor. When the stopper lever 30 is in this position, the front end 30a of the lever 30 is located above the cassette C2, which is therefore allowed to advance. The lever 30 has a rear end portion 30b bent toward the side plate 8 and inserted in a space portion 32 (see FIGS. 2 and 3) formed in a rear part of the side plate and located above the guide groove 13 in communication therewith. The rear end 30b of the lever 30 is pushed up by the slider 15 when the slider 15 advances, whereby the lever 30 is brought to the horizontal position shown in FIG. 2. In this horizontal position, the lever front end 30a is engageable with the rear end of the new cassette C2 on the insertion guide plate 10 to restrain the new cassette C2 from advancing until a cassette inserting action is initiated.

Figure 7:
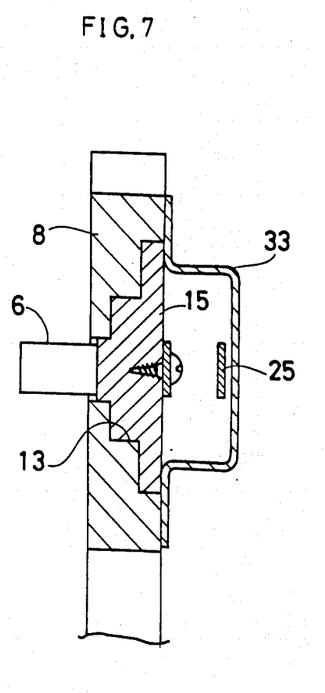
FIG. 7 is a view in section taken along the line VII—VII in FIG. 6.

With reference to FIGS. 1, 4 and 7, each side plate 8 is provided on its outer side with a cover 33 covering the roller support arm 16.

The construction and operation of the control means will be described below along with the cassette driving operation of the cassette delivery and insertion means.

Figure 9:
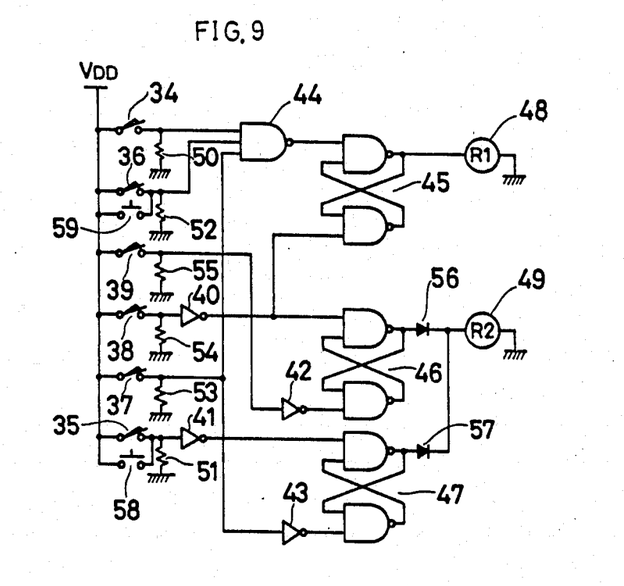
FIG. 9 is a diagram showing the circuit of control means for the embodiment.
Figure 10:
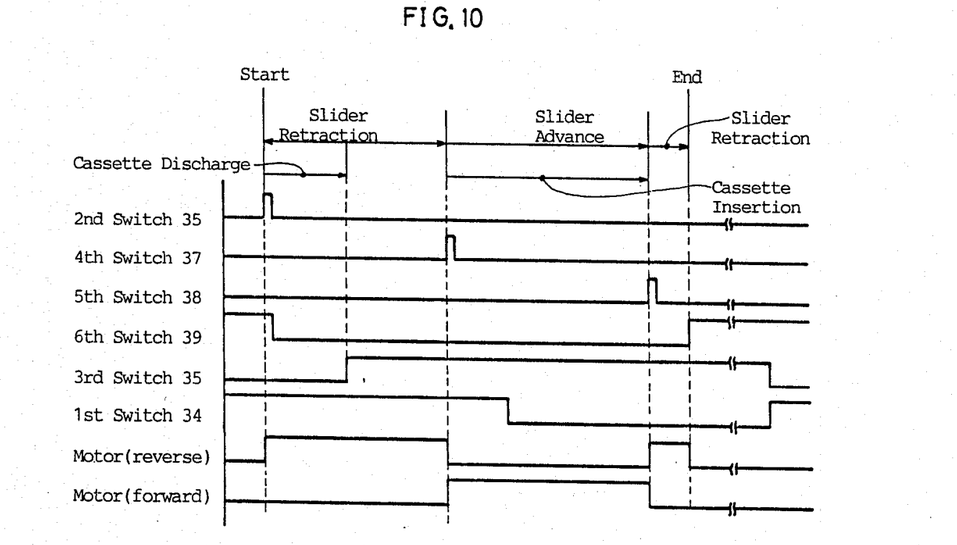
FIG. 10 is a time chart illustrating the cassette changing operation by the control means.

FIG. 8 shows the arrangement of microswitches (hereinafter referred to merely as "switches") constituting the control means and the movement of the cassette, FIG. 9 the circuit construction of the control means, and FIG. 10 the time chart of control operation. With reference to FIGS. 8 and 9, indicated at 34 is a first switch for detecting that the new cassette C2 has been placed on the insertion guide plate 10 (setting of the new cassette), at 35 a second switch for detecting ejection of the processed cassette C1, at 36 a third switch for detecting that the cassette C1 has been completely discharged to the discharge path P1, at 37 a fourth switch for detecting that the slider 15 (pushing pawl 6) has reached its retracted limit position, at 38 a fifth switch for detecting that the slider 15 has reached its advanced limit position, and at 39 a sixth switch for detecting that the slider 15 has reached a position (hereinafter referred to as the advanced limit position.

With reference to FIG. 9, indicated at 40 is a first NOT gate for inverting a signal from the fifth switch 38, at 41 a second NOT gate for inverting a signal from the second switch 35, at 42 a third NOT gate for inverting a signal from the sixth switch, at 43 a fourth NOT gate for inverting a signal from the fourth switch 37, at 44 a NAND gate for receiving signals from the first, third and fourth switches 34, 36, 37, at 45 a first flip-flop circuit (hereinafter referred to as the "first FF") for receiving an output from the NAND gate 44 and an output from the first NOT gate 40, at 46 a second flip-flop circuit (hereinafter referred to as the "second FF") for receiving outputs from the first and third NOT gates 40, 42, and at 47 a third flip-flop circuit (hereinafter referred to as the "third FF") for receiving outputs from the second and fourth NOT gates 41, 43. The output of the first FF 45 is fed to a first relay 48 for forwardly rotating the motor 7 to advance the sliders 15. Further the outputs of the second FF 46 and the third FF 47 are fed to a second relay 49 for reversely rotating the motor 7. Thus, the second relay 49 functions to retract the sliders 15 and rotate the delivery rollers 5 in a direction to discharge the ejected cassette C1. FIG. 9 further shows resistors 50 to 55 and diodes 56 and 57.

With reference to FIG. 8 (a), it is now assumed that a cassette C1 is within the VTR 1 and that a new cassette C2 is set in position on the insertion guide plate 10 (the first switch 34 in ON state). The changer then operates as follows.

At this time, the separator 3 is in the cassette discharge position, holding the discharge path P1 open. The pushing pawls 6 at opposite sides are in the original position (shown in FIG. 8 (a)) as slightly retracted from the advanced limit position shown in FIG. 8 (f).

(I) Discharge of the Cassette

When the cassette C1 is delivered to the inlet-outlet opening 1a by ejection after recording or reproduction the second switch 35 is turned on upon detecting the cassette C1 as seen in FIG. 8 (b), so that the second relay 49 functions to reversely rotate the motor 7, which rotates the delivery rollers 5, 5 in a direction to discharge the cassette. At the same time, the sliders 15, 15 are retracted. Before the retraction of the sliders 15, 15, the delivery rollers 5, 5 are in their retracted position indicated in the phantom line in FIG. 5 and opposed to the opposite sides of the cassette C1. Upon retraction of the sliders 15, 15, the rollers 5, 5 are brought to the solid-line projected position in FIG. 5 into pressing contact with the opposite sides of the cassette C1 at its front end. By the rotation of the delivery rollers 5, 5, the cassette C1 is withdrawn from the inlet-outlet opening 1a and sent into the discharge path P1 as shown in FIG. 8 (c), whereupon the cassette slides down the path P1 to its bottom, where it is retained by the stopper 11a as seen in FIG. 8 (d). At this time, the third switch 36 is turned on. On the other hand, the movement of the sliders 16, 16 to their retracted limit position turns on the fourth switch 37. During the retraction of the sliders 16, the pushing pawls 6 are temporarily retracted into the guide grooves 13 by contact with the opposite sides of the new cassette C2 and then opposed to the front end of the cassette as projected from the grooves upon moving forward past the cassette.

According to the present embodiment, the cassette C1 is delivered from the inlet-outlet opening 1a by rotating the pair of opposed delivery rollers 5, 5 as pressed by the spring 19 against the opposite sides of the cassette C1 ejected to the opening 1a, with the result that the cassette C1 can be withdrawn (discharged) reliably. Moreover, the delivery rollers 5, 5 are held in their retracted position away from the opposite sides of the cassette C1 until the cassette is ejected to the opening 1a, without interfering with the cassette to be ejected.

(II) Insertion of the Cassette

The actuation of the third and fourth switches 36, 37 energizes the first relay 48, which in turn initiates the motor 7 into forward rotation to advance the pushing pawls 6, 6 along with the sliders 16, 16. By the pushing pawls 6, 6, the cassette C2 is advanced through the insertion path P2 and inserted into the opening 1a after passing over the separator 3 as shown in FIGS. 3 and 8 (e) and (f). The cassette C2 is then sent to the recording-reproduction position by the loading mechanism within the VTR 1. During the insertion of the cassette, the delivery rollers 5, 5 rotate in a direction opposite to the direction of rotation for the discharge of the cassette, thereby contributing to the insertion, but the rollers are shifted to their retracted position by the sliders 15, 15 before the cassette C2 is fully inserted into the opening 1a. Accordingly, the pushing pawls 6, 6 only act to insert the cassette in the final stage. Upon the arrival of the sliders 15, 15 at the advanced limit position (i.e. upon completion of insertion of the cassette by the pawls 6, 6), the fifth switch 38 is turned on as shown in FIG. 8 (f), energizing the second relay 49 to reversely rotate the motor 7 and retracting the sliders 15, 15. When the sixth switch 39 is actuated as shown in FIG. 8 (g), the second relay 49 is deenergized to stop the motor 7. Thus, the sliders 15, 15, therefore, the pushing pawls 6, 6, are returned to the original position slightly retracted from the advanced limit position and are thereby held out of contact with the cassette to be ejected subsequently.

The cassette insertion means included in the present embodiment and comprising the pushing pawls 6, 6 which move straight forward and rearward is simpler in construction and permits the cassette to travel at a larger stroke, for example, as compared with pushing means including an arm which is pivotally moved to push the cassette into the inlet-outlet opening. Since there is no likelihood of the cassette slipping, the cassette can be inserted reliably.

The cassette C1 discharged is thereafter removed from the discharge path P1, and another new cassette is set in position on the insertion guide plate 10. The above operation is then repeated automatically.

When a cassette is to be inserted into the VTR 1 first (initialization) using the cassette changer 2, first and second operation switches 58 and 59 in FIG. 9 are turned on in succession. The closing of the first operation switch 58 sets the sliders 15 (pushing pawls 6) in the retracted limit position, and the cassette is set in position. When the second operation switch 59 is thereafter turned on, the sliders 15 advance, inserting the cassette into the VTR 1.

As described above, the cassette changer 2 has two paths, i.e., cassette discharge path P1 and cassette insertion path P2 intersecting the discharge path P1 immediately in front of the cassette inlet-outlet opening 1a, and a separator 3 provided at the intersection and movable by the force of a spring and by the force of travel of the cassette to selectively open one of the paths P1 and P2. The arrangement therefore does not require any special drive means for the change-over of the path, and is simple in construction and small-sized. Since the cassette is insertable forward and dischargeable rearward, the overall height of the changer can be approximately not larger than the height of the VTR 1. When VTR's are to be used as stacked in a plurality of stages for commercially preparing a large quantity of duplicate tapes at the same time, the above feature obviates the need to provide a large space between the stacked VTR's.

Further because the delivery roller constituting the cassette delivery means and the pushing pawl constituting the cassette insertion means are driven commonly by a drive mechanism comprising a single motor 7 as its drive source, the drive mechanism can be simple in construction and is reliable to operate and advantageous in respect of cost.

In addition to the foregoing embodiment, the present invention can be embodied with the following modifications.

(a) While it is advantageous to use the pushing pawl 6 as the cassette insertion means from the viewpoint of structure and reliable operation, it is alternatively possible to provide pairs of rollers at opposite sides of the insertion path P2 for inserting the cassette into the inlet-outlet opening.

(b) In the foregoing embodiment, the delivery rollers 5, 5 constituting the cassette delivery means are biased toward their projected position by a spring, whereas separate springs may be provided for the rollers 5, 5 individually. Further the cassette delivery means can alternatively be a chuck member which is movable forward and rearward for holding the cassette from opposite sides thereof.

(c) While the coiled torsion spring 4 is used in the above embodiment for giving a spring force for holding the separator 3 in the cassette discharge position, the separator 3 may be held in this position, for example, by utilizing the resiliency of the material (such as plastics) itself of the separator 3.

(d) The sensors constituting the control means are not limited to the microswitches used in the foregoing embodiment but may be photocouplers, proximity switches or other position sensors. The components of the control means other than the sensors (i.e., the control circuit) can also be modified variously.

(e) A chute can be connected to each of the discharge path P1 and the insertion path P2 to collect a multiplicity of processed cassettes and to supply a stock of new cassettes.

What I claim is:

1. A cassette changer mountable on a magnetic recording-reproduction apparatus, said recording-reproduction apparatus having a front formed with a cassette inlet-outlet opening, the cassette changer comprising discharge path means for slidably guiding a cassette down a slope when the cassette is delivered from said inlet-outlet opening after recording or reproduction, cassette delivery means for transferring the cassette from said inlet-outlet opening into said discharge path means after recording or reproduction, a cassette insertion path means positioned above said discharge path means for guiding a cassette along a horizontal path to said inlet-outlet opening for recording or reproduction, cassette insertion means for transporting the cassette to said inlet-outlet opening along said insertion path means for recording or reproduction, said insertion path means intersecting said discharge path means in front of said inlet-outlet opening, and a separator means disposed at said intersection of said insertion path means and said discharge path means, said separator means being movable between a cassette insertion position where said separator means obstructs said discharge path means while being clear of said insertion path means and a cassette discharge position where said separator means obstructs said insertion path means while being clear of said discharge path means.

2. A cassette changer according to claim 1 wherein said separator means comprises a separator member and pivot support means for pivotably supporting said separator member for pivotable movement between said cassette insertion position and said cassette discharge position, said separator means further comprising biasing means biasing said separator member in one of said positions.

3. A cassette changer according to claim 2, wherein said biasing means biases said separator member in said cassette discharge position, said separator member being pivoted from said cassette discharge position to said cassette insertion position against the bias of said biasing means when engaged by a cassette being moved along said insertion path by said cassette insertion means.

4. A cassette changer according to claim 2 further comprising a common drive means for driving said cassette delivery means and said cassette insertion means.

5. A cassette changer according to claim 4, wherein said cassette insertion means comprises slide means for engaging a cassette and moving it along said insertion path means to said inlet-outlet opening, said cassette discharge means comprising a roller means driven by a transmission belt, said roller means engaging a cassette and delivering the engaged cassette from said inlet-outlet opening to said discharge path means, said common drive means comprising a connection means connecting said slide means to said transmission belt.

6. A cassette changer according to claim 1, wherein said insertion path means has opposite sides, said cassette insertion means comprising pairs of rotatably rollers provided at said opposite sides of said insertion path.

7. A cassette changer according to claim 1, wherein said cassette delivery means has opposite sides, said cassette delivery means comprising a movable chuck member for holding the cassette from said opposite sides.

8. A cassette changer according to claim 1, wherein said insertion path means comprising opposed side plates parallel to said insertion path, said cassette insertion means comprising a guide groove means in each of said side plates, said cassette insertion means further comprising a slider slidable in each of said guide groove means, a drive means for moving said sliders forwardly and rearwardly along said guide groove means, a pawl pivotably mounted on each of said sliders for pivotal movement between a projecting position within said insertion path and retracted position outside of said insertion path, and biasing means biasing said pawl in said projecting position, said drive means being operable to move said sliders forwardly with said pawls in their projecting position to slidably move a cassette along said insertion path to said inlet-outlet opening.

9. A cassette changer according to claim 1, wherein said cassette delivery means comprises a pair of elongated roller support arms, delivery roller means mounted on one end portion of said support arms, pivot support means pivotably supporting the other end portion of said support arms for pivotably movement between a first position wherein said delivery rollers are in a projected position and a second position wherein said rollers are in a retracted position, said delivery rollers in said projected position engaging the cassette when the cassette is ejected from said inlet-outlet opening and delivering the engaged cassette from said inlet-outlet opening to said discharge path means, said delivery rollers in said retracted position being spaced from a cassette when a cassette is being delivered to said inlet-outlet opening by said cassette insertion means.

10. A cassette changer according to claim 1, wherein said insertion path means comprises opposed side plates parallel to said insertion path, said cassette insertion means comprising a guide groove means in each of said side plates, said cassette insertion means further comprising a slider means slidable in each of said guide groove means, a drive means for moving said slider means along said slide groove means to slidably move a cassette along said insertion path to said inlet-outlet opening, said cassette delivery means comprising a pair of elongated roller support arms extending generally juxtaposed to said side plates, delivery roller means mounted on one end portion of said support arms, pivot support means pivotably supporting the other end portion of said support arms for pivotable movement between a first position wherein said delivery rollers are in a projected position and a second position wherein said delivery rollers are in a retracted position, said delivery rollers in said projected position engaging the cassette when the cassette is ejected from said inlet-outlet opening and delivering the engaged cassette from said inlet-outlet opening to said discharge path means, said delivery rollers in said retracted position being spaced from a cassette when the cassette is being delivered to said inlet-outlet opening by said cassette insertion means.

11. A cassette changer according to claim 10, wherein said delivery roller means comprises rollers, a motor-driven transmission belt passing over said rollers, and connecting means connecting said slider means to said transmission belt so that said motor-driven transmission belt drives said slider means and said rollers.

12. A cassette changer mountable on a magnetic recording-reproduction apparatus, said recording-reproduction apparatus having a front formed with a cassette inlet-outlet opening, the cassette changer comprising a cassette insertion path means for guiding a cassette along a horizontal path to said inlet-outlet opening for recording or reproduction, cassette insertion means for transporting the cassette to said inlet-outlet opening along said insertion path means for recording or reproduction, said cassette insertion path means comprising opposed side plates parallel to said insertion path, said cassette insertion means comprising a guide groove means in each of said side plates, said cassette insertion means further comprising a slider slidable in each of said guide groove means, a drive means for moving said sliders forwardly and rearwardly along said guide groove means, a pawl pivotably mounted on each of said sliders for pivotal movement between a projecting position within said insertion path and a retracted position outside of said insertion path, and biasing means biasing said pawls in said projecting position, said drive means being operable to move said sliders and said pawls forwardly with said pawls in their projecting position to slidably move a cassette along said insertion path to said inlet-outlet opening, said drive means also being operable to move said sliders rearwardly as said pawls are pivoted to said retracted position upon engaging a next-to-be-inserted cassette disposed in said cassette insertion means.

13. A cassette changer mountable on a magnetic recording-reproduction apparatus, said recording-reproduction apparatus having a front formed with a cassette inlet-outlet opening, the cassette changer comprising discharge path means for slidably guiding a cassette down a slope when the cassette is delivered from said inlet-outlet opening after recording or reproduction, cassette delivery means for transferring the cassette from said inlet-outlet opening into said discharge path means after recording or reproduction, a cassette insertion path means positioned above said discharge path means for guiding a cassette along a horizontal path to said inlet-outlet opening for recording or reproduction, cassette insertion means for transporting the cassette to said inlet-outlet opening along said insertion path means for recording or reproduction, said insertion path means intersection said discharge path means in front of said inlet-outlet opening, and a separator means disposed at said intersection of said insertion path means and said discharge path means, said separator means being movable between a cassette insertion position where said separator means obstructs said discharge path means while being clear of said said insertion path means and a cassette discharge position where said separator means obstructs said insertion path means while being clear of said discharge path means, said insertion path means comprising opposed side plates parallel to said insertion path, said cassette insertion means comprising a guide grove means in each of said side plates, said cassette insertion means further comprising a slider slidable in each of said guide groove means, a drive means for moving said sliders forwardly and rearwardly along said guide groove means, a pawl pivotably mounted on each of said sliders for pivotal movement between a projecting position within said insertion path and a retracted position outside of said insertion path, biasing means biasing said pawl in said projecting position, said drive means being operable to move said sliders and said pawls forwardly with said pawls in their projecting position to slidably move a cassette along said insertion path to said inlet-outlet opening, said cassette delivery means comprising a pair of elongated roller support arms extending generally juxtaposed to said side plates, delivery roller means mounted on one end portion of said support arms, pivot support means pivotably supporting the other end portion of said support arms for pivotable movement between a first position wherein said delivery rollers are in a projected position and a second position wherein said rollers are in a retracted position, said delivery rollers in said projected position engaging the cassette when the cassette is ejected from said inlet-outlet opening and delivering the engaged cassette from said inlet-outlet opening to said discharge path means, said delivery rollers in said retracted position being spaced from a cassette when a cassette is being delivered to said inlet-outlet opening by said cassette insertion means.

* * * * *